(12) United States Patent
Sadovsky et al.

(10) Patent No.: US 7,796,309 B2
(45) Date of Patent: Sep. 14, 2010

(54) INTEGRATING ANALOG MARKUPS WITH ELECTRONIC DOCUMENTS

(75) Inventors: Vladimir Sadovsky, Bellevue, WA (US); Joseph D. Ternasky, Mountain View, CA (US); Hubert Van Hoof, Seattle, WA (US); Michael D. Stokes, Eagle, ID (US); Oliver H. Foehr, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 974 days.

(21) Appl. No.: 11/559,595

(22) Filed: Nov. 14, 2006

(65) Prior Publication Data

US 2008/0114782 A1 May 15, 2008

(51) Int. Cl.
*H04N 1/04* (2006.01)

(52) U.S. Cl. .................... 358/474; 358/496; 358/497

(58) Field of Classification Search ................ 358/474, 358/496, 497; 382/181, 229; 707/512
See application file for complete search history.

(56) References Cited

U.S. PATENT DOCUMENTS

| | | | |
|---|---|---|---|
| 3,611,291 A | 10/1971 | Frank | |
| 5,181,255 A | 1/1993 | Bloomberg | |
| 5,570,435 A | 10/1996 | Bloomberg et al. | |
| 5,587,560 A | 12/1996 | Crooks et al. | |
| 5,838,819 A | 11/1998 | Ruedisueli et al. | |
| 6,027,026 A | 2/2000 | Husain et al. | |
| 6,259,043 B1 | 7/2001 | Clary et al. | |
| 6,658,428 B2 | 12/2003 | Sokol et al. | |
| 2003/0004991 A1* | 1/2003 | Keskar et al. | 707/512 |
| 2004/0083434 A1 | 4/2004 | Fitch | |
| 2006/0008177 A1 | 1/2006 | Chermont et al. | |
| 2006/0103673 A1 | 5/2006 | Kerr | |

FOREIGN PATENT DOCUMENTS

WO    WO0150413 A1    7/2001

OTHER PUBLICATIONS

Hong, et al., "A Full Accuracy MPEG1 Audio Layer 3 (MP3) Decoder with Internal Data Converters", retrieved at <<http://ieeexplore.ieee.org/xpls/absall.jsp?arnumber=852731>>, IEEE, 2000 pp. 563-566.
Hull, "A Database for Handwritten text Recognition Research", retrieved at <<http://ieeexplore.ieee.org/xpl/abs_free.jsp?arNumber=291440>>, IEEE, vol. 16, No. 5, May 1994, pp. 550-554.
Mahmood, et al., "A Camera-Assisted Digital Notepad", retrieved at, <<http://research.microsoft.com/iccv2005/demo/MedPad/MedPadICCVDemo.doc>>, IBM Almaden Research Centre, San Jose, CA, pp. 02.
Plamondan, et al., "On-line and Off-line Handwritting Recognition: A Comprehensive Survey", retrieved at <<http://ieeexplore.ieee.org/xpl/freeabs_all.jsp?arnumber=824821>>, IEEE, vol. 22, No. 1, Jan. 2000, pp. 63-84.

* cited by examiner

Primary Examiner—Houshang Safipour
(74) Attorney, Agent, or Firm—Lee & Hayes, PLLC

(57) ABSTRACT

A document with one or more analog markups is obtained. An original electronic document corresponding to the document is also identified. The one or more analog markups are converted to one or more digital annotations, and the one or more digital annotations are stored in one or more parts of a package of the original electronic document.

17 Claims, 4 Drawing Sheets

INTEGRATING ANALOG MARKUPS WITH ELECTRONIC DOCUMENTS

BACKGROUND

As computer technology has advanced and computers have become increasingly commonplace, more and more documents are being maintained in electronic form rather than traditional paper hardcopy form. Despite this shift to electronic form, there are often times when people prefer to use a hardcopy form of the document. For example, during meetings people often like to have a paper copy of their documents, and sometimes make handwritten notes on those paper copies. Returning such a hard copy to an electronic form can be difficult. The hard copy could be converted to electronic form and stored as a separate file using a scanning device, but this results in multiple copies of the document in electronic form—one copy with the handwritten notes and the other without the handwritten notes. This problem is only exacerbated when multiple people have their own hard copies with their own handwritten notes scanned in, as this can result in multiple additional files. Thus, it would be beneficial to have a way to reduce the burden of managing and storing such multiple files.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with certain aspects of the integrating analog markups with electronic documents, a document with one or more analog markups is obtained. An original electronic document corresponding to the document is also identified. The one or more analog markups are converted to one or more digital annotations, and the one or more digital annotations are stored in one or more parts of a package of the original electronic document.

BRIEF DESCRIPTION OF THE DRAWINGS

The same numbers are used throughout the drawings to reference like features.

DETAILED DESCRIPTION

Integrating analog markups with electronic documents is discussed herein. A document having analog markups (such as handwritten notes) is accessed, such as by scanning the document using a scanning device. An attempt is made to find an original electronic document corresponding to the document. If the original electronic document is found, then the analog markups are identified and added as an annotation part of the original electronic document. No additional document or file need be saved as the analog markups are stored as part of the original electronic document. If the original electronic document is not found, then an electronic document is created, the analog markups are identified, and the analog markups are added as a part of the newly created electronic document.

When using the techniques described herein, users can make handwritten notes and/or other markings on a paper copy (or other hard copy) of an electronic document. The paper copy can then be scanned and converted to digital form. The handwritten notes and/or other markings are identified as analog markups to the electronic document, and are incorporated as annotations to the original electronic document. Thus, the handwritten notes and/or other markings from multiple different users can be added as annotations to the same electronic document.

Figure 1:
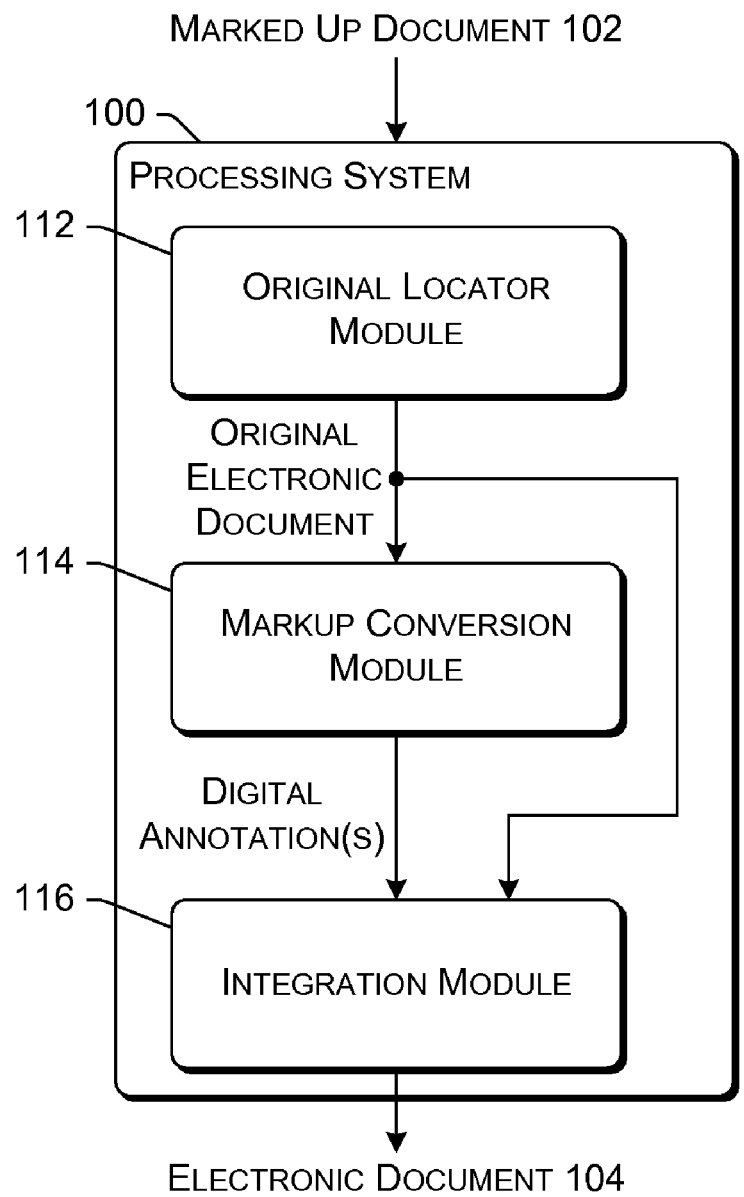
FIG. 1 illustrates an example processing system.

FIG. 1 illustrates an example processing system 100. Processing system 100 obtains a document 102 having analog markups, and generates an electronic document 104 based on document 102. Electronic document 104 includes a digital version of the analog markups on document 102. Processing system 100 includes an original locator module 112, a markup conversion module 114, and an integration module 116.

Processing system 100 obtains document 102 having analog markups. Processing system 100 can obtain document 102 in any of a variety of different manners. Document 102 may be stored in a known location, a user of processing system may input the location of document 102, document 102 may be passed to processing system 100, and so forth. Document 102 is an electronic version of a hardcopy document that is converted to electronic form by processing system 100, or by another component (not shown) before it is made available to processing system 100. Typically, document 102 is scanned using a conventional scanning device and software, firmware, and/or hardware uses the resultant scan to create document 102.

Document 102 can include analog markups. Analog markups refer to handwritten notes or other markings that are made on a hard copy. Analog markups are typically made by a user with some type of writing device, such as a pen, pencil, marker, and so forth. These analog markups are identified and stored as part of an electronic document corresponding to document 102, as discussed in more detail below.

Figure 2:
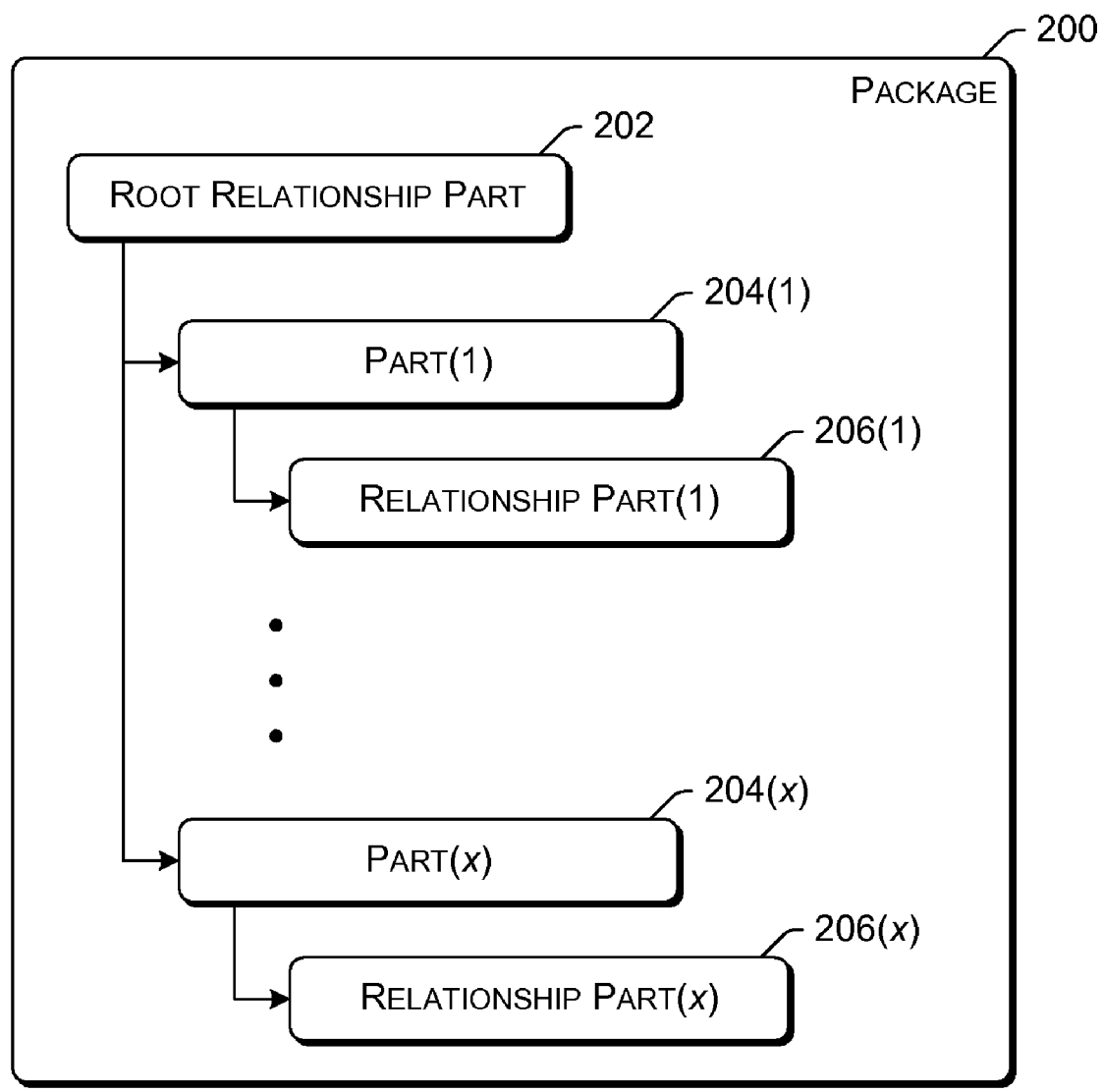
FIG. 2 illustrates an example package for an electronic document.

Processing system accesses, processes, and stores electronic documents. Electronic documents refer to any of a variety of different types of documents (e.g., including characters, symbols, equations, images, and so forth) that are stored electronically rather than in rendered form (e.g., rather than in paper or other hard copy form, film, bitmap image, or any other physically rendered form). Electronic documents are stored as packages having multiple parts. FIG. 2 illustrates an example package 200 for an electronic document. Package 200 includes a root relationship part 202, multiple (x) parts 204(1), ..., 204(x), and multiple (x) relationship parts 206(1), ..., 206(x). A package refers to the logical entity that holds a collection of one or more parts, and a container refers to a file that represents a package. Typically the container is a single file, although alternatively the container may be made up of multiple files.

Each part 204 and relationship part 206, as well as root relationship part 202, can be stored in different manners. In certain embodiments, each part is a separate file, but is accessed by applications and the operating system through the package 200 rather than individually. For example, if an application desires to display an electronic document, the application does not initially access individual parts 204. Rather, the application initially accesses root relationship part 202 (and optionally one or more relationship parts 206) to identify which one or more parts 204 have the data to create the display for the electronic document, and then accesses the identified parts 204.

Root relationship part 202 identifies all the parts 204 in package 200. Each part 204 is a collection of bytes of the electronic document. Any of a variety of different formats can be used for parts 204, including public and proprietary formats. For example, some parts may be in an eXtensible Markup Language (XML) format, some may be in a HyperText Markup Language (HTML) format, others may be in a proprietary format, and so forth.

Different types of parts 204 can be included. One type of part is typically a payload part, in which most, if not all, of the data of the electronic part is stored (e.g., the words, symbols, characters, etc. of a word processing document; the data, formulas, etc., in the entries of a spreadsheet; the records of a database; the pixel values for an image; and so forth). Other types of parts describe different aspects of the electronic document, such as digital rights management (DRM) techniques employed to protect the electronic document (e.g., specifying user identifiers of others that are permitted to access one or more parts of the electronic document, or a digital certificate that is required by a device or application to access one or more parts of the electronic document, etc.), tracking information for the electronic document, annotations or comments for one or more parts of the electronic document, and so forth.

Each part 204 can have associated with it one or more relationship parts 206. Although each part 204 in FIG. 2 is illustrated as having one associated relationship part, alternatively some parts 204 may have no associated relationship parts, and some parts 204 may have two or more associated relationship parts. Each relationship part 206 identifies a part 204 in package 200 or a resource external to package 200. An external resource is a resource that is not part of package 200; the resource may be located on the same computing device as package 200, or alternatively a different computing device. For example, a relationship part 206 associated with a DRM part 204 may identify the parts 204 in package 200 to which the DRM techniques in the DRM part 204 are applied. By way of another example, a relationship part 206 associated with a payload part 204 may identify an image stored at a resource external to package 200 (e.g., a location on a particular server or other computing device) that is to be included as part of the data of the electronic document (e.g., displayed to the user when the electronic document is displayed). The part 204 or external resource identified by the relationship part 206 can be identified in the relationship part 206 in different manners, such as by including in the relationship part 206 a Uniform Resource Identifier (URI) of the part 204 or external resource.

Typically root relationship part 202 does not directly identify all the relationship parts 206, rather root relationship part 202 relies on the parts 204 to identify their respective relationship parts 206. Alternatively, root relationship part 202 may directly identify all the relationship parts 206 as well as the parts 204.

In FIG. 2, root relationship part 202 is illustrated as identifying parts 204, and each part 204 is illustrated as identifying an associated relationship part 206. These identifications can be made in different manners. In certain embodiments, a particular naming convention is followed that allows such identifications to be made. For example, in certain embodiments the naming convention states that the relationship parts 206 are to follow the format "/_rels/*.rels", where the "*" refers to the associated part 204. So, following this example, if a part has the name "/foo.txt", then the associated relationship part 206 would have the name "/_rels/foo.txt.rels" or "/_rels/foo.rels". By way of another example, in certain embodiments the naming convention states that the parts 204 are to follow the format "/*", where the "*" refers to the part 204, so root relationship part 202 can maintain an entry in the format of "/*" for each part in package 200.

Alternatively, the parts and relationship parts 206 may be identified in different manners other than using such naming conventions. For example, root relationship part 202 may include the name (or other unique identifier) of each part 204, and each part 204 may include the name (or other unique identifier) of each associated relationship part 206.

In certain embodiments, package 200 conforms to the Open Packaging Conventions (OPC) specification. Some descriptions of OPC are included herein. Additional information regarding OPC is available as the Ecma Office Open XML File Formats Standard from Ecma International of Geneva, Switzerland (a current draft can be found on the Internet at "www" followed by "ecma-international.org/news/TC45$_{13}$ current_work/TC45-2006-50_final_draft.htm"). Package 200 can also conform to other proprietary or public standards, such as the XML Paper Specification (XPS). Additional information regarding XPS is available from Microsoft Corporation of Redmond, Wash.

Following OPC, each part 204 has properties including a name, a content type, and optionally a growth hint. The name property specifies the name of the part. The part names are represented by a logical hierarchy that consists of segments, with the last segment containing the actual content and the preceding segments serving to organize the parts of the package. For example, the part name "/hello/world/doc.xml" includes three segments: "hello", "world", and "doc.xml". The segments "hello" and "world" serve to organize the parts of the package, and the segment "doc.xml" contains the actual content of the part.

The content type property specifies the type of content stored in the part (e.g., payload, DRM, tracking information, etc.). The content type property defines a media type, a subtype, and an optional set of parameters. Content types conform to the definition and syntax for media types as specified in Request for Comments (RFC) 2616—Hypertext Transfer Protocol—HTTP/1.1 (e.g., section 3.7).

The growth hint property is an optional property that specifies a suggested number of bytes to reserve for the part to grow in-place. The growth hint property identifies the number of bytes by which the creator of the part predicts that the part will grow. This information may be used, for example, to reserve space in a mapping to a particular physical format in order to allow the part to grow in-place.

Following OPC, each relationship part 206 represents a relationship between a source part and a target resource (which may be another part in package 200). Relationship parts store relationships using XML. The XML of a relationship part nests one or more <Relationship> elements in a single <Relationships> element. Each <Relationship> element includes a target attribute, an id attribute, a type attribute, and optionally a target mode attribute.

The target attribute is a URI reference pointing to a target resource. The URI reference may be a URI or a relative reference (a reference to another part in the same package as the relationship part). The id attribute is an XML identifier that uniquely identifies the relationship part within the package that includes the relationship part. The id attribute conforms to the W3C Recommendation "XML Schema Part 2: Datatypes".

The type attribute is a URM that uniquely defines the role of the relationship part. The type attribute allows a meaning to be associated with the relationship part. For example, the type attribute may indicate that the relationship part is a hyperlink, or points to a font, or points to an image, and so forth. The target mode attribute indicates whether the target attribute describes a resource inside the package or outside the package. For example, the value "internal" can be used to indicate that the target attribute describes a resource inside the same package as the relationship part, and the value "external" can be used to indicate that the target attribute describes a resource that is not inside the same package as the relationship part.

The container that stores the package maps the root relationship part 202, the parts 204, and the relationship parts 206 to physical package item names. The container can store the package in any of a variety of different manners, and in the OPC specification the container is a ZIP archive file. The ZIP archive file conforms to the well-known ZIP file format specification, but in certain embodiments excludes the elements of the ZIP file format specification that relate to encryption or decryption.

Each package is typically stored as a single ZIP file, although alternatively a package may be stored as multiple ZIP files, or multiple packages may be included in a single ZIP file. A ZIP file includes ZIP items, which are the root relationship part 202, the parts 204, and the relationship parts 206 of package 200.

Returning to FIG. 1, processing system 100 includes an original locator module 112, a markup conversion module 114, and an integration module 116. Original locator module 112 analyzes marked up document 102 and attempts to locate an original electronic document that corresponds to document 102. Markup conversion module 114 analyzes marked up document 102, identifies the analog markups on document 102, and converts the analog markups to digital annotations. Integration module 116 integrates the digital annotations with the document identified by original locator module 112. Modules 112-116 are discussed in more detail below.

Three different modules 112-116 are illustrated in FIG. 1. It is to be appreciated, however, that in certain embodiments one or more of modules 112-116 can be combined into a single module. Additionally, in certain embodiments one or more of modules 112-116 can be separated into multiple modules.

Original locator module 112 analyzes marked up document 102 and attempts to locate an original electronic document that corresponds to document 102. The original electronic document located by module 112 is a previously generated electronic document corresponding to document 102 (e.g., the electronic document that was printed to generate the hardcopy version of document 102 (before the analog markups were added)). An original document that corresponds to document 102 can be located in a variety of different manners. In certain embodiments, a record of electronic documents accessible to processing system 100 is maintained, the record identifying the individual electronic documents and their locations (e.g., for each electronic document, the computing device and the folder or location on that computing device where the document is stored). This record can be a database, a list, or any other mechanism for identifying the electronic documents. This record can be maintained by processing system 100, or alternatively can be maintained by another component but accessible to processing system 100.

The record of electronic documents is typically indexed in some manner. The index can be, for example, some reference characters that are typically included in the documents, such as a title, a unique id or reference number, and so forth. As the index data for each document is typically included in the document itself, original locator module 112 can analyze document 102 to find this index data and then use the index data from document 102 to search the record of electronic documents. When a matching entry in the record is found, it corresponds to the original electronic document. For example, assume that the record of electronic documents is indexed by document title. Module 112 can use conventional Optical Character Recognition (OCR) techniques to locate a heading of "title" in document 102 and then recognize the characters that follow the "title" heading. These characters can be identified as the title of document 102, and the record of electronic documents is searched to find a document in the record having the same title. This document having the same title is identified by module 112 as being the original electronic document corresponding to document 102.

Alternatively, some other identifier (e.g., a unique identifier) can be included on the documents, such as a uniform resource identifier (URI), a barcode, or some other value. This identifier can refer to a record of electronic documents, or alternatively may identify the location of the electronic document itself. For example, the document may include a URI or barcode that identifies the electronic document and where it is located.

In other alternatives, rather than having some identifier, the content of document 102 is obtained (e.g., using conventional OCR techniques) and this content is compared to the content of the electronic documents accessible to processing system 100. A byte-by-byte comparison of the content of document 102 and the content of each electronic document accessible to processing system 100 can be performed to determine if corresponding byte values of the documents are the same, and if so then that electronic document is the original electronic document corresponding to document 102. Hash values of the documents can also be generated first, with a byte-by-byte comparison of two documents being performed only if the hash values of the two documents are the same.

Situations can arise where original locator module 112 is unable to locate an original electronic document corresponding to document 102. If no previously existing electronic document corresponding to document 102 can be located, then module 112 creates a new electronic document corresponding to document 102. Conventional OCR techniques are used to identify the content of document 102 and an electronic document is generated that includes this content. It should be noted that the OCR techniques attempt to distinguish between any analog markups on document 102 and the original content on document 102. Only the original content of document 102 (e.g., the text, characters, or other information that was originally printed as the hard copy) is used as the content of the newly created electronic document; the analog markups are not included as part of the newly created electronic document. This newly created electronic document can be treated as the original electronic document corresponding to document 102 by modules 114 and 116.

Markup conversion module 114 analyzes marked-up document 102, identifies the analog markups on document 102, and converts the analog markups to digital annotations. This analysis can be performed in different manners. In certain embodiments, document 102 is compared to the original electronic document identified by original locator module 112. Conventional OCR techniques can be used to identify the characters (including letters, numbers, symbols, etc.) of document 102. Any part of document 102 that cannot be identified as characters by the OCR techniques, or that is identified by the OCR techniques but is not in the original electronic document, is determined to be an analog markup on document 102. Alternatively, rather than using OCR techniques, document 102 can be compared to the original electronic document and the image of the original electronic document can be subtracted from the image of document 102 (e.g., on a pixel by pixel basis, those pixels having the same value in the image of document 102 as in the image of the original electronic document can be deleted from document 102), and that part of document 102 that remains can be determined to be the analog markup on document 102.

Multiple analog markups can be identified on document 102 as separate analog markups, such as those separated by a threshold amount of space, those made in different color inks, those on different pages, and so forth. Additionally, different analog markups can be determined to correspond to different reviewers. For example, if some analog markups are made in blue ink and some are made in red ink, then module 114 can determine that there were two different reviewers and associate the analog markups in blue ink with one reviewer and the analog markups made in red ink with a second reviewer.

A date and/or time can also be associated with the analog markups. Typically, this date and/or time is the date and/or time that marked up document 102 is captured (e.g., scanned using a scanning device). Alternatively, other dates and/or times may be used, such as the date and/or time that original locator module 112 identifies the original electronic document, the date and/or time that markup conversion module 114 identifies the analog markups, a date and/or time in the analog markup (e.g., conventional OCR techniques can be used to identify a handwritten date and/or time in the analog markup), and so forth.

In certain embodiments, the analog markups are converted to text using conventional OCR techniques. In other words, the actual characters that the analog markups represent are identified and those characters are stored. In other embodiments, the analog markups are converted to a vector-based representation. This vector-based representation is a digital representation of the lines that were made on document 102 as the analog markups, such as characters that the OCR techniques could not recognize, arrows to portions of the document, circles around portions of the document, and so forth. The vector-based representation includes vectors that identify lines that were drawn rather than being a bit map of what was drawn. Alternatively, the analog markups may be stored as bit maps.

The analog markups, in their text-based and/or vector-based representations, are stored as one or more digital annotations or comments to the original electronic document. Each different analog markup is typically included in a different annotation, although alternatively multiple analog markups may be included in a single annotation and/or one or more analog markups may be separated into separate annotations.

The exact manner in which these annotations or comments are associated with particular parts of the electronic document can vary based on the particular type of document (e.g., whether it is a word processing document, a spreadsheet document, and so forth). For example, an indication of the location on the document where the analog markup was made may be maintained as part of the annotation, such as a page number, row and column number, spreadsheet cell identifier, and so forth. This allows the annotation or comment to identify the particular location of the electronic document so that the markups, in their text-based and/or vector-based representations, are associated with the same area of the electronic document as the corresponding analog markups were with the hardcopy of the document.

Integration module 116 integrates the digital annotations from markup conversion module 114 with the electronic document identified by (or created by) original locator module 112. The electronic documents, as discussed above, are stored as a package having multiple parts. Integration module 116 stores the annotations generated by markup conversion module 114 as different parts (e.g., parts 204 of FIG. 2) in the package of the original electronic document as identified by original locator module 112. Each such annotation part can include a relationship part (e.g., a relationship part 206 of FIG. 2) that identifies the part (e.g., a part 204 of FIG. 2) that the annotation corresponds to, and optionally a location within that part that the annotation corresponds to.

Figure 3:
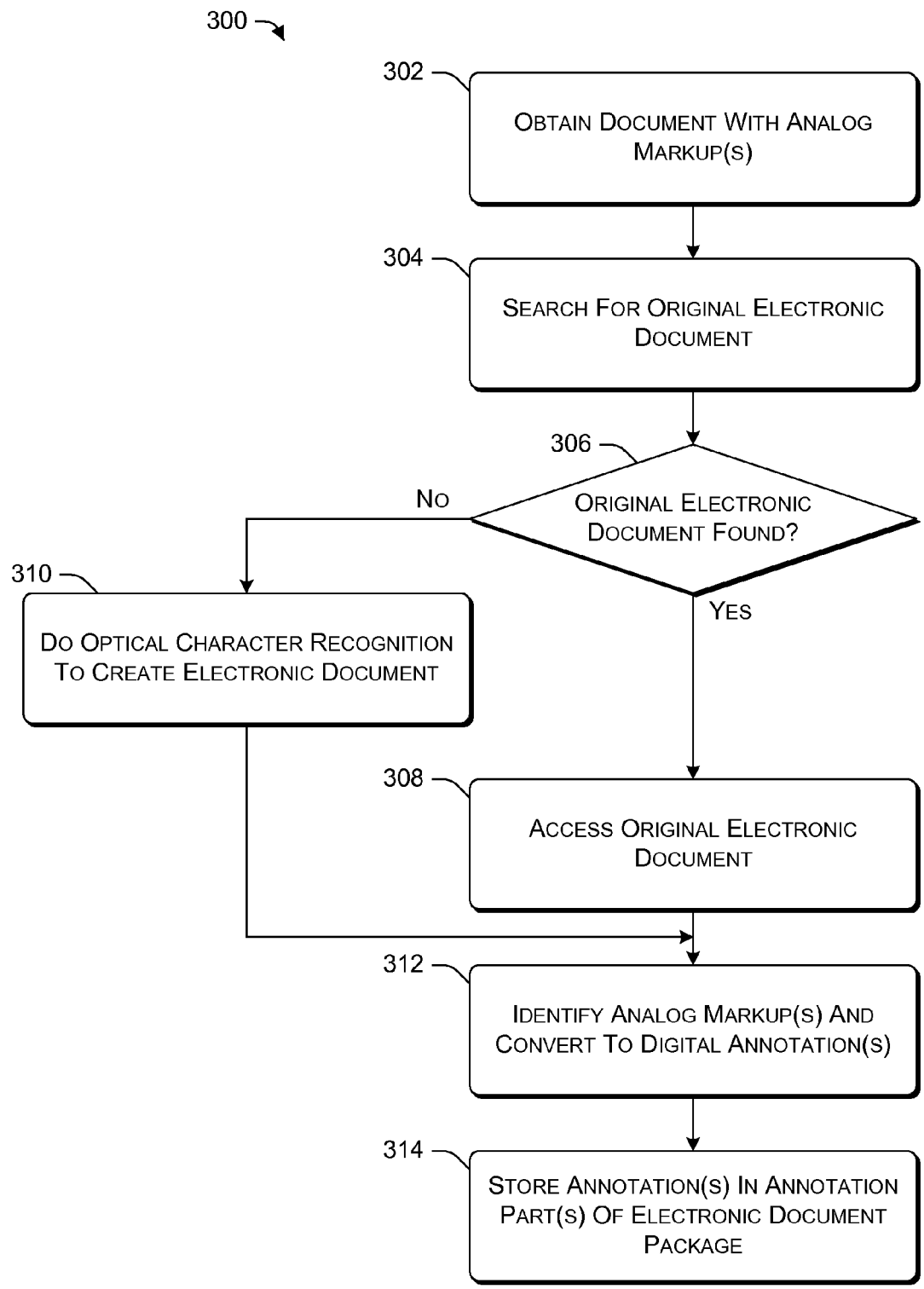
FIG. 3 illustrates an example process for integrating analog markups with an electronic digital document.

FIG. 3 illustrates an example process 300 for integrating analog markups with an electronic digital document. Process 300 can be carried out, for example, by processing system 100 of FIG. 1, and may be implemented in software, firmware, hardware, or combinations thereof.

Initially, a document with analog markups is obtained (act 302), and a search for an original electronic document corresponding to the document obtained in act 302 is performed (act 304). As discussed above with respect to original locator module 112, the original electronic document can be located in any of a variety of different manners. A check is then made as to whether an original electronic document was found (act 306). If the original electronic document was found, then that original electronic document is accessed (act 308). However, if no original electronic document was found, then conventional OCR techniques are used to create the original electronic document (act 310).

Process 300 then proceeds using the electronic document accessed in act 308 or the electronic document created in act 310. The analog markup(s) are identified and converted to one or more digital annotations (act 312). This conversion is performed, for example, as discussed above with reference to markup conversion module 114. These annotations from act 312 are stored as one or more annotation parts in a package of an electronic document (act 314).

Thus, it can be seen from the discussion herein that handwritten notes and other markups made on a hard copy of an electronic document can be integrated with that original electronic document. The user can make whatever notes he or she desires on the hard copy, have the hard copy scanned using a scanning device, and have the notes automatically integrated with the original electronic document by processing system 100. Subsequent users can do the same thing, allowing multiple notes from multiple users to be integrated with the same original electronic document.

Figure 4:
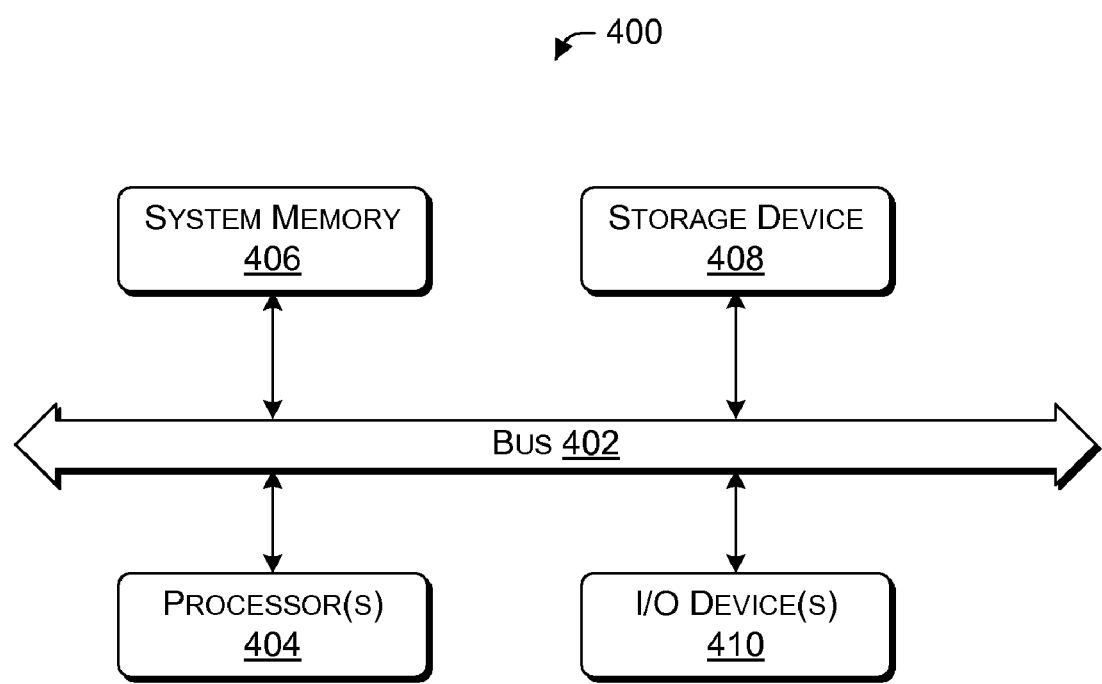
FIG. 4 illustrates an example of a general computing device that can be used to implement the techniques discussed herein.

FIG. 4 illustrates an example of a general computing device 400 that can be used to implement the techniques discussed herein. Computing device 400 can implement, for example, processing system 100 of FIG. 1, and/or process 300 of FIG. 3. Computing device 400 is only one example of a computing device and is not intended to suggest any limitation as to the scope of use or functionality of the computing device and network architectures. Neither should computing device 400 be interpreted as having any requirement regarding the inclusion (or exclusion) of any components or the coupling or combination of components illustrated in the example computing device 400.

Computing device 400 is a general-purpose computing device that can include, but is not limited to, one or more processors or processing units 404, a system memory 406, and a bus 402 that couples various system components including the processor 404 to the system memory 406.

Bus 402 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

System memory 406 includes computer readable media in the form of volatile memory, such as random access memory (RAM), and/or non-volatile memory, such as read only memory (ROM) 412. Memory 406 can include removable and/or non-removable memory.

Computing device 400 may also include other removable/non-removable, volatile/non-volatile computer storage device 408. By way of example, storage device 408 may be one or more of a hard disk drive for reading from and writing to a non-removable, non-volatile magnetic media, a magnetic disk drive for reading from and writing to a removable, non-volatile magnetic disk (e.g., a "floppy disk"), an optical disk drive for reading from and/or writing to a removable, non-volatile optical disk such as a CD, DVD, or other optical media, a flash memory device, and so forth. These storage device(s) and their associated computer-readable media provide storage of computer readable instructions, data structures, program modules, and/or other data for computing device 400.

User commands and other information can be entered into computing device 400 via one or more input/output (I/O) devices 410, such as a keyboard, a pointing device (e.g., a "mouse"), a microphone, a joystick, a game pad, a satellite dish, a serial port, a universal serial bus (USB), an IEEE 1394 bus, a scanner, a network interface or adapter, a modem, and so forth. Information and data can also be output by computing device 400 via one or more I/O devices 410, such as a monitor, a printer, a network interface or adapter, a modem, a speaker, and so forth.

An implementation of the integrating analog markups with electronic documents described herein may be described in the general context of processor-executable instructions or computer-executable instructions, such as program modules, executed by one or more computing devices. Generally, program modules include routines, programs, objects, components, data structures, etc. that perform particular tasks or implement particular abstract data types. Typically, the functionality of the program modules may be combined or distributed as desired in various embodiments.

An implementation of the integrating analog markups with electronic documents may be stored on or transmitted across some form of computer readable media. Computer readable media or processor-readable media can be any available media that can be accessed by a computer. By way of example, and not limitation, computer readable media or processor readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Alternatively, all or portions of these modules and techniques may be implemented in hardware or a combination of hardware, software, and/or firmware. For example, one or more application specific integrated circuits (ASICs) or programmable logic devices (PLDs) could be designed or programmed to implement one or more portions of the framework.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer readable media having stored thereon a plurality of instructions that, when executed by one or more processors, causes the one or more processors to:
   obtain a document with one or more analog markups;
   identify an original electronic document corresponding to the document;
   convert the one or more analog markups to one or more digital annotations, wherein to convert the one or more analog markups to one or more digital annotations is to:
      use optical character recognition to identify characters in the document;
      compare the identified characters to characters of the original electronic document;
      identify, as the one or more analog markups, any of the identified characters that are not in the original electronic document; and
      store those identified characters that are not in the original electronic document as the one or more digital annotations; and
   store the one or more digital annotations in one or more parts of a package of the original electronic document.

2. One or more computer readable media as recited in claim 1, wherein to identify the original document is to access a record of electronic documents and locate, based on the record, the original electronic document.

3. One or more computer readable media as recited in claim 2, wherein to locate the original document is to identify reference characters in the document to be used as an index, and search the record of electronic documents for the same reference characters.

4. One or more computer readable media as recited in claim 1, wherein to identify the original electronic document is to identify a uniform resource identifier in the document that identifies a location where the original electronic document can be found.

5. One or more computer readable media as recited in claim 1, wherein to identify the original electronic document is to identify a barcode in the document that identifies the original electronic document.

6. One or more computer readable media as recited in claim 1, wherein to identify the original document is to perform, for one or more electronic documents that may potentially be the original electronic document, a byte-by-byte comparison of the document and the electronic document, and determine that one of the one or more electronic documents is the original electronic document if the byte-by-byte comparison indicates that the bytes of the one electronic document are the same as the bytes of the document.

7. One or more computer readable media as recited in claim 1, wherein to convert the one or more analog markups to one or more digital annotations is to convert the one or more analog markups to a text-based representation and/or a vector-based representation.

8. A method comprising:
accessing a document having an analog markup;
checking whether an original electronic document corresponding to the document exists;
if an original electronic document corresponding to the document exists, then using the original electronic document as the corresponding electronic document, and otherwise creating the corresponding electronic document from the document;
converting the analog markup to a digital annotation, wherein the converting comprises:
using optical character recognition to identify characters in the document;
comparing the identified characters to characters of the original electronic document;
identifying, as the analog markup, any of the identified characters that are not in the original electronic document; and
storing those identified characters that are not in the original electronic document as the digital annotation; and
storing the digital annotation as a part of a package of the corresponding electronic document.

9. A method as recited in claim 8, wherein the checking comprises accessing a record of electronic documents and locating, based on the record, the original electronic document.

10. A method as recited in claim 9, wherein locating the original document comprises identifying reference characters in the document to be used as an index, and searching the record of electronic documents for the same reference characters.

11. A method as recited in claim 8, wherein the checking comprises checking for a uniform resource identifier in the document that identifies a location where the original electronic document can be found.

12. A method as recited in claim 8, wherein the checking comprises performing, for one or more electronic documents that may potentially be the original electronic document, a byte-by-byte comparison of the document and the electronic document, and determining that one of the one or more electronic documents is the original electronic document if the byte-by-byte comparison indicates that the bytes of the one electronic document are the same as the bytes of the document.

13. A method as recited in claim 8, wherein the converting comprises converting the analog markup to a text-based representation.

14. A method as recited in claim 8, wherein the converting comprises converting the analog markup to a vector-based representation.

15. A system comprising:
an original locator module configured to identify an original electronic document corresponding to a scanned document;
a markup conversion module configured to convert markups on the scanned document to one or more annotations, wherein to convert the markups to one or more annotations is to:
use optical character recognition to identify characters in the scanned document;
compare the identified characters to characters of the original electronic document;
identify, as the markups, any of the identified characters that are not in the original electronic document; and
store those identified characters that are not in the original electronic document as the one or more annotations; and
an integration module configured to save the one or more annotations as one or more parts of a package of the original electronic document.

16. A system as recited in claim 15, wherein to identify the original document is to access a record of electronic documents and locate, based on the record, the original electronic document.

17. A system as recited in claim 16, wherein to locate the original document is to identify reference characters in the scanned document to be used as an index, and search the record of electronic documents for the same reference characters.

* * * * *